United States Patent

Stephan et al.

[11] Patent Number: 5,817,409
[45] Date of Patent: Oct. 6, 1998

[54] FABRIC PREPREG PRODUCED FROM SUCH FABRIC, LIGHTWEIGHT COMPONENT FROM SUCH PREPREGS, OVERHEAD BAGGAGE RACK FOR AIRCRAFT

[75] Inventors: Walter Anton Stephan; Richard Reinhold Lechner, both of St. Martin, Austria

[73] Assignee: Fischer Advanced Composite Components Gesellschaft m.b.H., Ried im Innkreis, Austria

[21] Appl. No.: 637,385

[22] Filed: Apr. 25, 1996

Related U.S. Application Data

[62] Division of Ser. No. 352,116, Dec. 1, 1994, abandoned.

[30] Foreign Application Priority Data

Dec. 17, 1993 [AT] Austria ........................... 2565/93

[51] Int. Cl.⁶ .............. B64D 11/00; B29C 67/14
[52] U.S. Cl. ............... 428/219; 428/34.6; 428/34.7; 428/166; 428/118; 428/116; 428/60; 428/61; 428/334; 428/335; 428/218; 428/220
[58] Field of Search ................. 428/116, 117, 428/34.6, 34.7, 166, 118, 60, 61, 334, 335, 218, 219–220; 151/198, 258; 224/133

[56] References Cited

U.S. PATENT DOCUMENTS

| H47 | 4/1986 | Monib | 428/116 |
|---|---|---|---|
| 3,859,158 | 1/1975 | Park | 156/331 |
| 4,092,453 | 5/1978 | Jonda | 428/255 |
| 4,186,179 | 1/1980 | Katsuki et al. | 423/447.4 |
| 4,712,710 | 12/1987 | Freeman et al. | 220/414 |
| 4,917,747 | 4/1990 | Chin et al. | 156/198 |

FOREIGN PATENT DOCUMENTS

| 0 271 118 | 6/1988 | European Pat. Off. |
| 0 302 449 | 8/1989 | European Pat. Off. |
| 0 557 267 | 8/1993 | European Pat. Off. |
| 2478693 | 9/1981 | France |
| 2561509 | 9/1985 | France |
| 2563153 | 10/1985 | France |
| 28 23 426 | 12/1978 | Germany |
| 50-145620 | 11/1975 | Japan |
| 54-025999 | 2/1979 | Japan |
| 55-164148 | 12/1980 | Japan |
| 59-005027 | 1/1984 | Japan |
| 60-166413 | 8/1985 | Japan |
| 1463969 | 2/1977 | United Kingdom |
| WO/9412708 | 6/1994 | WIPO |

OTHER PUBLICATIONS

Patent Abstract of Japan, Kokai Nr. 4–294 136, 1997.
John Murphy, Reinforced Plastics Handbook, pp. 59–62 (1994).
Handbook of Fillers and Reinforcements for Plastics, 1978, Van Nostrand Reinhold Company, pp. 570–571.

*Primary Examiner*—Richard Weisberger
*Attorney, Agent, or Firm*—Jacobson, Price, Holman & Stern, PLLC

[57] ABSTRACT

Woven or non-woven fabric, in particular for the manufacture of prepregs especially for the manufacture of structural components in the aviation industry, manufactured of fibers, preferably carbon fibers having an elasticity modulus in excess of 80 000 N/mm², preferably of 200 000 N/mm² and a specific gravity of preferably 1,5 g/cm³, and not more than 2,1 g/cm³, wherein the fibers are composed of monofilaments, and the fibers and therefore also the fabrics have been pressed flat, preferably calendered. In order to produce a woven or non-woven fabric which is mechanically particularly strong and yet can be manufactured economically, each fiber is composed of at least 2000, preferably 3000 individual mono-filaments (3K=200 tex=200 g/1000 m). The woven or non-woven fabric is preferably used for the manufacture of prepregs and henceforth for lightweight structural components especially for the aviation industry and in particular for overhead luggage compartments.

14 Claims, 7 Drawing Sheets

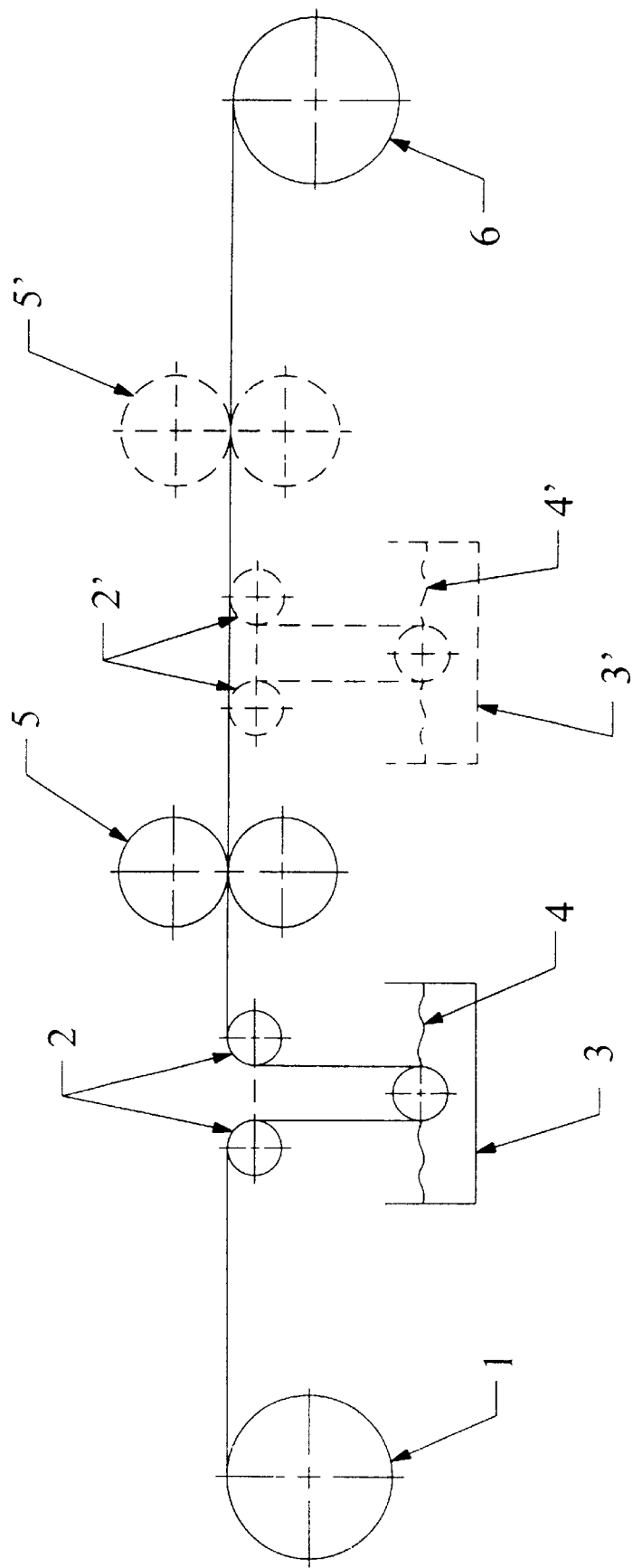

FABRIC PREPREG PRODUCED FROM SUCH FABRIC, LIGHTWEIGHT COMPONENT FROM SUCH PREPREGS, OVERHEAD BAGGAGE RACK FOR AIRCRAFT

This is a division of application Ser. No. 08/352,116, filed Dec. 1, 1994 now abandoned.

BACKGROUND OF THE INVENTION AND PRIOR ART

The invention relates to a woven or non-woven fabric for the manufacture of prepregs, serving specifically for the manufacture of components in the aircraft industry, a prepreg manufactured from such woven or non-woven fabric, a process for its manufacture, a lightweight component which is to be used particularly in the aircraft industry and a container manufactured with the use of such lightweight component, more specifically an overhead baggage storage rack for aircraft.

In aviation there is a permanent demand for the use of ever lighter components for which reason the investigation of all components of aircraft or containers and components used or transported on board aircraft with a view to saving weight as much as possible and feasible, and to attain this with available means is aimed at.

U.S. Pat. No. 3,859,158 describes a belt of open fabric of fibrous materials wherein the fibres by recalculation are found to have an elasticity modulus of more than 275500 E/mm$^2$ and the composite articles manufactured from the thus described belt attain specific gravities of 0,4 to 1,4 g/cm. However, no directions are given how to obtain a construction of composite parts which is particularly capable of withstanding high mechanical stresses whilst preserving the lightweight construction characteristics, and in particular not in connection with applications in the aviation industry.

The use of fibres of mono-filaments for the manufacture of a fabric for prepregs is disclosed for example in JP-A-4-294136 (Toray). However, in that case, no teachings are to be found concerning the exact number of filaments per thread which are required for a construction which can be subjected to high mechanical stresses and nevertheless lends itself to economic manufacture.

The reduction of the proportion of gaps in an open fabric by calendering is described in EP-A-O 302 449 and can advantageously be employed for any kind of woven and non-woven fabric in order to improve processing ability.

The use of carbon fibres for the manufacture of fabrics for the production of prepregs is described for example in U.S. Pat. No. 4,092,453.

OBJECTS OF THE INVENTION

However, both, components of the aircraft itself, for example internal installation parts such as overhead luggage storage compartments, screen panels etc., as well as containers transported onboard the aircraft, for example trolleys, suitcases, accessory boxes or the like, must be so designed that the strength requirements prescribed with regard to the safety of the components are complied with in spite of an extremely weight saving, lightweight construction. Even though the use of carbon fibres, which possess a substantially higher specific strength than glass fibres, is aimed at increasingly it has not yet been possible by conventional construction methods to achieve satisfactorily a substantial weight reduction combined with adequate stability as compared with constructions made of glass fibre materials and yet to ensure an economically priced manufacture.

Accordingly, it was an object of the present invention firstly to provide a woven or non-woven fabric, for example of unidirectional fibres side by side which optionally may be secured against mutual displacement merely by some kind of stitching, which combined with high strength offers low weight and in addition can be manufactured simply and economically and which is suitable particularly for the manufacture of materials, in particular lightweight components for the aircraft industry.

A second object resided in finding, for this field of application, a starting material, specifically in the form of a pre-impregnated woven or non-woven fabric (pre-impregnated fabric known for short as prepreg), for the manufacture of a variety of light, and in spite of that very solid components and structural parts for the aircraft industry or for the manufacture of accessories in that field.

A further object of the present invention was the proposal of an advantageous process for processing the woven or non-woven fabric and for the manufacture of a pre-impregnated woven or non-woven fabric as well as suitable measures and parameters for the manufacture of a lightweight structural element.

A further object, finally, was the construction of a container of reduced weight and nevertheless complying with the demanded strength requirements for use on board aircraft and more specifically for overhead baggage compartments. However, having regard to the aforementioned criteria and features also all other containers such as for example trolleys, suitcases, boxes etc., are likewise included.

GENERAL DESCRIPTION OF THE INVENTION

In order to attain the first object, in a woven or non-woven fabric, in particular for the manufacture of prepregs, more specifically for the manufacture of structural components in the aircraft industry, manufactured from fibres, preferably carbon fibres having an elasticity modulus of more than 80 000 N/mm$^2$, preferably of more than 200 000 N/mm$^2$ and a specific gravity of preferably 1,5 g/cm$^3$, and at the most 2,1 g/cm$^3$, wherein the fibres are composed of mono-filaments and these, and therefore also the woven or non-woven fabrics, are optionally pressed flat, preferably calendared, it is provided, in accordance with the invention, that each fibre is composed of at least 2000, preferably 3000 mono-filaments (3K=200 tex =200 g/1000 m). It is possible only due to this feature that such woven or non-woven fabrics can be manufactured economically and that an optimal compromise between low weight on the one hand and high strength on the other is attained.

The weight aimed at of the raw woven or non-woven fabric, given without a resin component, should be as low as possible. This can be adjusted, apart from by employing the prescribed fibre thickness of preferably 3000 mono-filaments and the thereby defined material weight, also by the number of the threads per length or surface area (cm$^2$) of the woven or non-woven fabric. The object of having as little as possible weight per surface area can advantageously be attained by a so-called "open fabric", in which between the individual yarns uniform distances are maintained. In the present case, a number of 3,71±5% threads per cm or 3,71×3,71 threads per cm$^2$ was found to be particularly suitable having regard to the additional fabric parameters to be disclosed further below.

According to the invention, the raw weight of the woven or non-woven fabric which includes only the weight per surface area of the processed, preferably woven carbon fibres without resin content, is less than 190 g/m², preferably between 170 and 150 g/m², specifically 150+5/−2 g/m².

Since the processing and usability properties depend not only on the weight per surface area but also on the remaining parameters such as resin content and, where applicable, weaving pattern and since, having regard to the extremely weight reduced mode of manufacture, new manufacturing steps had to be adopted in the production of the prepregs in order to ensure the processability of the pre-impregnated woven or non-woven fabrics in the manufacture of light aircraft components, these further prepreg features must obviously be appropriately matched to one another, both in the context of manufacture of the light basic woven or non-woven fabric itself, as well as with a view to the mutual adaption of the individual parameters to one another.

In order to avoid changes of the thread direction during the handling or use of fabrics in manufacture, e.g. already during the weaving process or also during impregnation, and in order to minimise deviations from normal thread directions which in turn would impair the mechanical properties of such a fabric, it was found necessary to select the manner of weaving in such a way that the greatest possible dimensional stability was attained. Thus a deviation of the weft thread of 15 mm/m was set as the permissible upper limit up to which weakening of the fabric is not to be expected to such an extent that the safety of the components is no longer ensured.

Although besides the plain weave in which at any stage one weft yarn floats over a warp thread, a variety of weaves could be conceived and used, such plain weave is the most economical modification because it is the simplest and which, due to the weave texture, also offers the advantages of dimensional stability and minimal fraying.

In weave types in which the weft yarn floats over two or more warp threads there may, if necessary, be attained even better mechanical properties such as bending and tensile strength as compared with the plain weave. The lower drapability in the case of a plain weave as compared with other weaves, for example Panama, Koepper or Atlas weaves is of no disadvantageous significance in the context of the special application in the aircraft industry and accordingly required no correction by other weaving parameters.

The essential requirement that the strength properties of lightweight components are complied with, presupposes that both, the individual yarns in relation to one another, as well as the respective layers in relation to one another, must be adequate interconnected. The reduced contact area necessitated by the need of an "open" woven or non-woven fabric having, relatively large yarn spacings and the reduction of both the bonding area as well as the mechanical properties dictated by the largest possible interweaving frequency, is counteracted advantageously according to the invention by a suitable selection of the type and amount of curable synthetic resin (duroplastics) for impregnating the woven or non-woven fabric.

Thus, the second object of the invention was attained specifically by a slight increase of the resin content as compared with conventional materials for comparable applications, wherein the resin content, which also includes the volatile components derived from the solvent impregnation, is held between 37% and 55%, preferably between 46% and 50% more specifically at 47%. When appropriately selecting a strong thread material it is thus possible also to ensure an adequate strength of the fibre composite component itself. However, as compared with conventional prepregs as are generally used in the aircraft and aircraft accessory industry for comparable components, the slight increase according to the invention of the average resin content above 37% is more than compensated for by the weight reduction of the raw fabric. Depending on the resin content and proportion of volatile substances, the pre-impregnated fabrics can be manufactured having a weight of less than 300 g/m², ideally about 270 g/m² but not less than 250 g/m², so that it finally becomes possible to attain in the complete component a weight reduction of between 20 and 35%.

Advantageously the use of phenolic resins, optionally of epoxy resin, with an H-type solvent (90% ethanol and 10% acetone), preferably an HE-type solvent (100% ethanol) is provided for, which also, compared with conventional prepreg systems, comprise a reduced content of free formaldehyd. Phenolic resins, besides their low creep tendency, also have high configurational stability in hot conditions and good resistance against chemicals, and, specifically for use in aircraft interiors, offer the advantage of low flammability. The selection and amount of the solvent used for impregnating influences very substantially the processability of the materials by changing the tackiness as well as the kind, instant and amount of volatile components produced. The content of volatile components which, however, in the case of phenolic resins also includes the water component produced during the polycondensation, lies ideally below the maximum of 9%. The most advantageous solution is found with solvents on an ethanol basis (HE) and which ensure good processability—because of the higher boiling point (period of production of the volatile components)—and tackiness as well as a lower health hazard, even though other solvents (H) as well ensure the processability of the impregnated woven or non-woven fabric as well as the properties in use of the components manufactured from these woven or non-woven fabrics.

The process for the manufacture of a prepreg is characterised according to the invention by the impregnation of a woven or non-woven fabric, preferably a woven or non-woven fabric in one of the above described embodiments with a curable synthetic resin and by calendering the woven or non-woven fabric after or even during the impregnation, optionally also between two impregnation steps. Besides the previously mentioned advantages of the calendered fibres such as increased tackiness and static load-bearing capacity, this processing step is also particularly advantageous for visible surfaces of structural components for the aircraft interior. By the close e.g. of the fabric gaps, the transfer of the structure onto clear foils, e.g. Tedlar is reduced and accordingly the need for the employment of optical correction measures such as filling and varnishing is substantially reduced.

The impregnation which precedes the or each calendering step preferably takes place with a resin content higher than that required for the final product, which is then reduced by the subsequent calendering of the woven or non-woven fabric with simultaneous flattening of the fibres thereof. This represents a simple method by which after a brief adjustment period the rapid and economic production of the prepregs with the desired characteristics, such as thickness and resin content is possible.

According to a further feature of the invention the third object is attained by the creation of a light structural component, in particular a panel for the aircraft industry, for example for use as a wall panel, building panel or the like, comprising at least one core, preferably composed of a honeycomb material, extending over the predominating portion of the surface area of the structural component and at least one coating layer on both sides of the or each core, which is characterised in that at least one of the coating layers, preferably both coating layers comprise(s) a laminate, preferably employing a woven or non-woven fabric according to any one of the above described embodiments which, by means of an adhesive, is bonded to the core or a prepreg according to one of the above paragraphs.

It may be necessary and even advantageous in order to increase the strength of the light structural component, in positions where buckling or flexing is liable to occur, to apply at least one additional prepreg layer of fibre glass fabric or laminate using a woven or non-woven fabric according to one of the above described embodiments or preferably of prepregs according to one of the preceding paragraphs, overlapping these buckling or flexing localities. Since it was found in our trials that failures had been caused by the release of the coating layers from the core material, the additional prepreg or laminate layers are preferably provided directly on the core material underneath the or each covering layer.

With corresponding advantages as previously mentioned, according to a further feature of the invention, at least one additional prepreg laminate layer of glass fibre fabric is provided on that side of the covering layer which faces away from the core in positions in which bores or recesses must be provided.

The next object of the invention, the provision of a light and yet solid container, specifically for the aviation industry is attained by a container composed of plane end and where appropriate partitioning walls as well as a bent or buckled component forming at least part of the side walls or cabinet surround, characterised in that the end and/or the partitioning walls and/or the component forming the cabinet surround have been manufactured as a sandwich structure and are constructed of fibre composite components in accordance with the aforedescribed lightweight components.

Advantageously a honeycomb material is employed as the core material which preferably has a hexagonal structure and a bulk density of less than 60 kg/$^3$. By this construction it is possible to combine an appropriate weight reduction with a construction which comprise with the high loading-bearing capacity demanded in the aviation field for safety reasons, so that the container is suitable both for installation as an aircraft component as well as a container to be transported along such as a trolley, suitcase or box, better than conventional constructions.

According to a further feature of the invention, the component constituting the side walls or cabinet surround is connected at least in a limited region of the circumference of the end and/or partitioning walls by overlapping of the prepregs or laminates and in another partial region of the circumference of the plane end and/or partitioning walls by means of a subsequently produced connection, preferably a screw connection, adhesive connection or welding connection. By the simple mould stripping of the cured container the manufacture of a monolithic structure with only few additional fastening means or manufacturing steps is provided, and in addition thereto the saving of additional material (connecting means for the panels forming the walls) the resultant overall weight is reduced and also the manufacturing process is appreciably simplified, while providing a very good structural stability of the container.

In order to so provide the fixing or force application positions that the required loads, which are applied there locally and from there to the entire structure of the component, can be tolerated and that delamination, i.e. release of the covering layer from the core material is avoided, there is provided at the positions of transition between the end and/or partitioning walls and the component forming the side walls or cabinet surround and/or at bending or buckling or other force application localities in the said wall or the component at least one further layer of laminate or prepreg overlapping these transfer, bending or buckling positions. This additional layer or layers, provided preferably below the one or more covering layer(s), preferably directly on the core material, due to locally increased rigidity as well as by increasing the resin content and the resulting enlargement of the surface contributing to carrying the load, both between the individual layers as well as between the laminate forming the covering layer and the core, lend an adequate strength to the positions particularly endangered by peak loading so that the loads occurring even in extreme conditions, i.e. during critical flight conditions, are withstood.

The application of forces and thereby the transfer of tensions in the structural component should be progressive in order to avoid the risk of damage by tension peaks. These tension peaks which result from abrupt cross-sectional changes such as notches and edges as well as differences in thickness due to different numbers of layers, are avoided by the provision of at least two mutually overlapping laminate or prepreg layers having different but mutually adapted dimensions, and this also renders the optical appearance substantially more pleasing, a factor which is of importance in the context of visible components in an aircraft interior, in addition to mechanical stability.

According to a further feature of the invention, an additional laminate or prepreg layer, preferably of fibre glass fabric is to be provided for improved protection against delamination in positions at which bores or other rebates have to be provided for, in such a manner that the marginal zones remaining on or in the component are covered to an adequate extent to appropriately resist the reaction forces applied during processing. In this context such layer is advantageously so placed that it comes to lie on the side facing the processing tool, in the special case of the outside of the container, as a covering layer of the laminate; although an application on the side facing the core, i.e. between the covering layer and the core is possible, this necessitates a less optimal adaptation of the processing parameters.

In positions in which end, partition walls, fittings or stiffening ribs must be connected to the component forming the side walls or surround at least one additional laminate or prepreg layer, ideally of fibre glass material is to be provided, which further, due to its narrower mesh width, appropriately prevents possible fraying of the carbon material woven with a large mesh width, preferably above the covering layer and for the sake of convenience, from the front edge of the upper side to the front edge of the lower side of the component forming the surround. The connecting or fitting of the aforesaid component by means of screws, rivets or the like is rendered reliably performable by the neat machining out of the bores or where applicable rebates necessary for the adhesive application of the inserts.

With the same advantages as stated in the preceding paragraph, in the case of the component forming the surround having rebates provided on both sides of the partition wall or stiffening means for installation and/or service purposes such as in the case of the provision of fastening bores, these regions are specially prepared by a layer of laminate or prepreg, a glass fibre material being ideally used in this special case.

As in the region of bores, production methods do not ensure in positions of pronounced directional changes, as occur in the rear wall region where plane walls abut at an angle between 90% and 180%, that in those regions during the occurrence of heavy loads no release takes place from the core of the laminate produced of, preferably, the prepreg according to the invention with low resin application on the contact area. Accordingly it is appropriate to provide this region with an additional layer of laminate or prepreg, advantageously of glass fibre material which in terms of dimensions extends at least sufficiently far into the planar areas, so that due to the production technology a reliable curing or bonding of the cover layer onto the core is ensured, that is to say that the pressure applied by the pressure platens during curing is still effective in the aforesaid regions.

The overhead baggage compartment comprising the container according to the invention which in accordance with the preceding paragraphs is constructed of two plane, essentially trapezoidally-shaped end walls, a partition wall or stiffening or partitioning rib subsequently applied in the interior of the container and a monolithic constructional part forming the surround, is characterised in that the component in the region of bores in the end walls close to an upper corner point and close to the laminate layer forming the covering layer of the container, which serve for the suspension of the container, is reinforced by three to five, preferably four additional layers of carbon laminate or carbon prepregs. In that manner the most endangered localities of suspension of the baggage rack are so designed that combined with the lightest possible mode of construction all prescribed strength requirements are attained and even exceeded or that respectively permissible deformation values are not exceeded. In order to counteract the special deformations which can arise when using the component or the shortening of the container and resultant tipping over of the terminal walls and the longitudinal forces arising therefrom in the most effective manner, the ripping out of the support means of the container must be avoided. This is best attained in that the additional layers in those regions in which rear walls of different inclination are integrally connected to the respective end wall during curing by means of the prepreg forming the covering layer, or by adhesive application thereto of a laminate, are folded around to an adequate extent onto the end walls.

In many cases, unavoidably, a reinforcement element passes between the lower and rear most wall section of the component forming the surround, and at least in the region of this reinforcement element an additional carbon prepreg or laminate is provided covering this element and preferably extending so far into the laminate proper, in a constructional sense into the space between the covering layer and the core, that applied forces will be withstood and the application of these forces takes place over a larger area so as to provide the container with additional stability.

According to a further feature of the invention a reinforcement element extends at the level of the partition or stiffening rib between the lower and the rear wall section of the component and at least one layer of carbon prepreg or laminate is provided covering this reinforcement element, which layer is preferably selected sufficiently large that the ends thereof on the rear and the lower wall section are equi-distantly removed from the lower edge of the structural component. In this manner the forces arising are uniformly applied to the structural component. In the region of the partition or the stiffening rib, at the fastening localities in the rear wall, a patch of carbon prepreg in accordance with the above described pre-impregnated fabric, is applied which is at least so large that it passes the regions of maximum force application, yet at least beyond the regions of the fastening means, e.g. screws or adhesive bonding positions in such a manner that the tension arising during loading can be reduced to a minimum and no delaminations between the covering layers and core arise. From a production point of view it appears advantageous that this additional layer of carbon is applied in direct contact with the core although, for reasons of strength and stability, any other sequence is conceivable as well.

In the following description, which should be read against the background of the aforegoing, the invention will be further elucidated by way of a non-limiting working example with reference to the accompanying drawings.

BRIEF DESCRIPTION OF THE DRAWINGS

In this context

FIG. 2 shows schematically an advantageous production process for the prepreg according to the invention.

DETAILED DESCRIPTION OF THE DRAWINGS AND OF SPECIFIC EMBODIMENTS

Figure 1A:
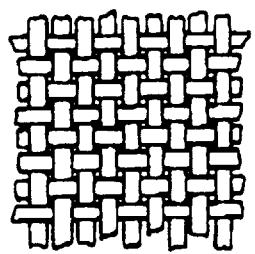
FIG. 1 illustrates some fabric types which may be used for the manufacture of the prepregs in accordance with the invention.
Figure 1B:
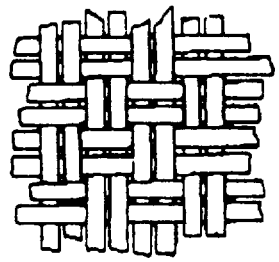
Figure 1C:
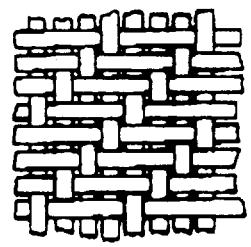
Figure 1D:
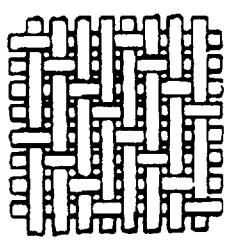
Figure 1E:
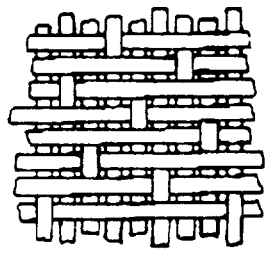
Figure 1F:
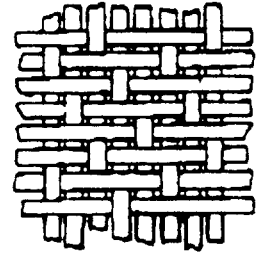

In FIG. 1 a plurality of weave types are illustrated which besides or in combination with non-woven fabrics can be used for the manufacture of prepregs. The individual yarns or threads of the woven or non-woven fabric are composed of materials of high strength i.e. with an elasticity modulus, E, greater than 80 000 n/mm², preferably manufactured of carbon fibres with E≦or greater than about 200 000 N/mm² and yet of low weight (1,75 g/cm³ as compared with glass fibres at 2,5 g/cm²), wherein each thread is advantageously made of 3000 mono-filaments corresponding to about 200 g/1000 m. The woven fabric in FIG. 1a represents a plain weave which according to the invention is preferably used, which offers the highest resistance against fraying when being cut to size and the highest dimensional stability during handling. FIG. 1b shows the so-called Koepper weave ("Twill"). This weave is characterised by greater strength and rigidity of the laminate due to its reduced thread deflection and by better draping ability. FIG. 1c shows the Atlas weave which, because of its very low thread deflection, is characterised by particularly good draping ability and also because of the very good surface textures attainable can be used for pronounced spherical and visible components.

For the manufacture of the light woven or non-woven fabrics according to the invention the number of threads per unit of surface area is reduced as much as possible to the extent permitted by the required mechanical properties of the component to be manufactured therefrom which in practice is preferably determined by various tests. Preferably the weight per surface area of the fabric is reduced to 170 g/m² and even to 150 g/m² which then results in a value of 3,71±5% threads per cm weft or warp thread.

In what follows, for the sake of simplicity—and because this is the most preferred modification—reference will only be made to woven fabrics, even though naturally analogous embodiments are also possible with the use of non-woven fabrics unless this obviously cannot be the case due to special reference for example to the type of weave.

From FIG. 2 a diagrammatic representation of an advantageous manufacturing method for a prepreg material, further properties of the woven fabric and the prepreg manufactured therefrom become apparent. The dry fabric 1, optionally already calendered, is passed by way of rollers 2 through a bath in which the fabric 1 is impregnated with a mixture 4 of resin and solvent—being of the H-type or more appropriately of the HE-type, the processing speed and the further process parameters, advantageously determined by practical testing, are so adjusted that the resin content, in this case preferably phenolic resins, however, optionally also epoxy resins, are advantageously somewhat larger after the bath 3 than the required resin content for the completed prepregs. Thereafter the impregnated woven fabric, depending on whether it has been processed in a previously calendered state, or been impregnated in the raw condition, is passed to rollers 5 in which the fabric is calendered and thereby the threads as well are pressed flat, or alternatively only the thickness of the resin layer can be adjusted by part of the resin/solvent mixture being squeezed out again. Optionally as indicated by the broken line illustration, a further impregnation step in a bath 3' may take place with the same or a different solvent/resin mixture 4', whereafter the again impregnated fabric is passed to a further set of rollers 5'. After the last impregnation and/or calendering step the prepregs are ready for further processing. They preferably now comprise a resin content—including the volatile solvent component—of 46 to 50%.

In order for the strength properties of the component (delamination value in the sandwich delamination test) to be further improved the described expedient according to which the individual fibres of the woven or non-woven fabric are pressed flat, preferably calendered, whereby the gaps in the fabric or non-woven fabric become closed, is particularly advantageous. Because later on the surface impregnated with resin, the contact area of the threads one to the other and to the adjoining layers, the interlaminar contact area is enlarged, it is possible to substantially improve on the one hand the processability, essentially characterised by the adhesiveness and thus by the adhesion during the manufacture of a light structural component, and on the other hand also the static load-bearing capacity, characterised by the adhesion of the prepreg layers in the cured condition.

As an alternative to the above described method, the prepregs can of course also be manufactured in a melting process wherein it is necessary that the fabric during the process is likewise calendered or that, as described before, a pre-calendered fabric is employed.

Figure 3:
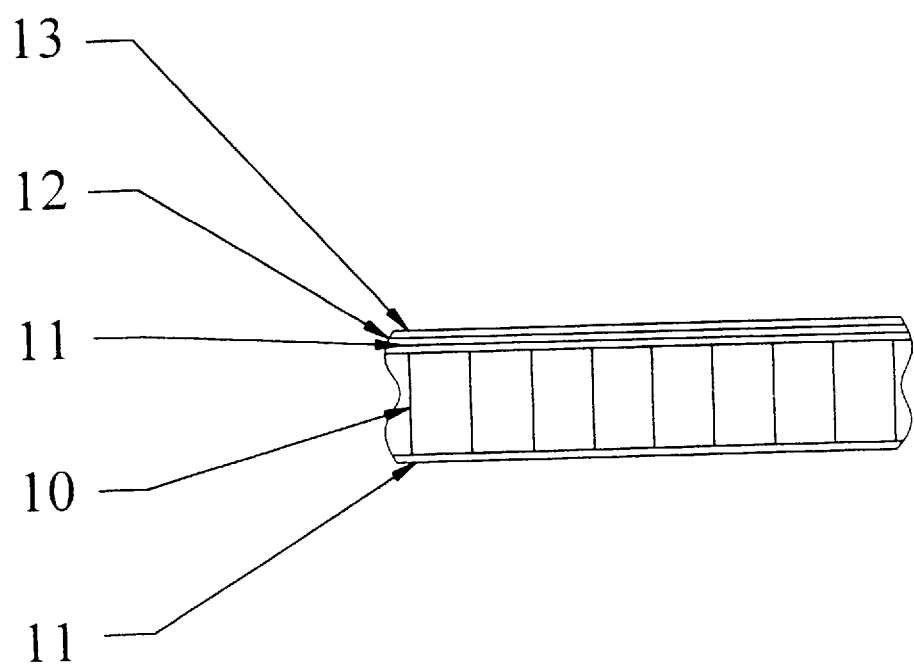
FIG. 3 shows the structure of an embodiment of a lightweight structural component according to the invention as can be used also for the manufacture of containers or the like for aviation.

In FIG. 3 the construction of a light structural component is schematically shown as is used for the manufacture of containers in the aviation field, for example for overhead luggage racks, suitcases, boxes or the like but also as a cladding component for example as an interior panel. On a core material 10, preferably, because of its favourable strength to weight ratio, a honeycomb material having honeycombs orientated normal to the direction of main loading, a prepreg 11 according to the invention is applied to each side as a covering layer, preferably being composed of carbon fibre fabric of low weight per surface area and having an appropriately adapted resin content. Due to the lesser thickness of the carbon material as compared with glass fibre materials and for further increasing the strength, an increase of the thickness of the core material as compared with comparable sandwich constructions has been carried out. Thus, for example for overhead luggage racks the core thickness can be increased from 13,5 mm to 13,7 mm, which in calculating the rigidity has a particularly favourable effect because of the square relationship. In places where rebates are provided, for example for the fitting of additional components, or where a risk of delamination exists due to particular loading in use or due to geometric peculiarities of the structural component, such as strong deflections or bucklings, an additional layer of prepreg material 12 as illustrated in FIG. 3, advantageously a light glass fibre prepreg, may be applied, locally restricted to one or even both sides onto the cover layer 11, in order to increase the resin content (content per surface area) in that region and to ensure the bonding of the individual layers respectively the yarns to one another by a reduced mesh width of the intermediate or final layer. The visible surface, particularly in the case of the inside of overhead luggage storage compartments, is formed by a foil or panel 13 optically covering and protecting the layers there below, more specifically by a Tedlar foil. The mechanical protection against the penetration or knocking of objects into the inner, main loading-bearing covering layer of carbon fabric, is provided by a light layer of glass fibre fabric.

Figure 4:
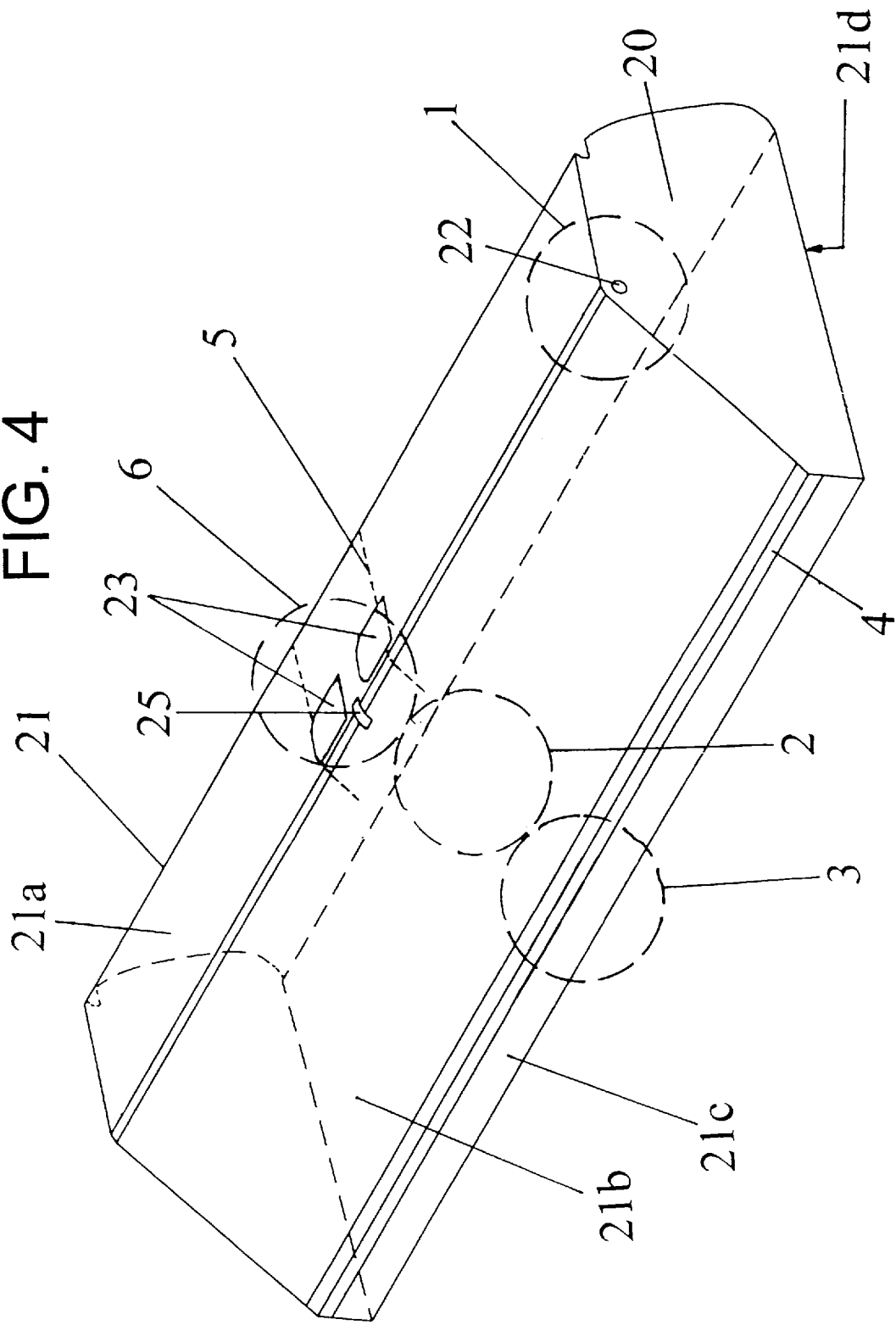
In FIG. 4 a schematic perspective view of an overhead luggage rack for aircraft is shown as an example of a container according to the invention, preferably composed of wall elements having the structure of FIG. 3.

A special application example is the overhead luggage rack illustrated schematically in FIG. 4. It is composed of plane end walls 20 monolithically manufactured together with a component 21 constituting the cabinet surround and thus connected thereto in one operation. This component 21 together with the end walls is formed of a wall section 21a opened against the installation orientation, a rear wall 21b extending at an incline to the rear and downwardly, the essentially vertically downwardly extending rear wall section 21c as well as the bottom 21d of the luggage rack. The front may be closed by a flap which is not illustrated here and which essentially is optionally formed, however, advantageously is made as a lightweight component likewise according to the present invention and is subsequently fitted to the container or may be manufactured integrally with the latter, more specifically with the component 21 forming the surround.

In the manufacture of this special container the component forming it, prepregs and pre-cut core panels are suitably applied onto a mould and fixed by pressure panels in the vacuum process. Thereafter the curing of the assembly proceeds at increased external pressure and temperature in an appropriate plant, e.g. an autoclave. The then predominating process parameters are to be selected such that on the one hand the greatest possible resin flow is attained and thereby the optimum connection between the core and the covering layer, and also that the volatile components which may be formed during the curing reaction can be transported away in the best possible manner. In the present case it was found expedient to maintain a holding period of 60 to 90 minutes at 80°–100° C., at 0 bar and 100% vacuum, after such holding periods increasing the temperature to 135°±4°

C. and 120 minutes at 2 bar and 10% vacuum. Heating took place at a heating up rate of about 3,6° C./min and cooling took place at constant pressure up to a temperature of less than about 47° C.

However, this is not the only conceivable curing cycle which can be employed, for example less cumbersome cycles, e.g. 135° C. for a holding period of 90 minutes at 2 bar produced the desired result. However, the most suitable cycle was eventually employed.

In the plane end walls 20 at least one bore 22 each is provided in the transition region, that is to say exactly at the curvature of the rest position of a construction designed as a movable connection (with core material) between the upper wall 21a and the rear wall 21b, at least one bore 22, for suspending the container from the inner structure of the aircraft. A further fixing point is positioned in the middle of the luggage rack, where the screw connection elements are connected by a suitable aperture, bore 25 which preferably is reinforced by additional laminate or prepreg layers 31 in the transitional region with the stiffening ribs or partition walls.

This fastening point is an arm downwardly extending from the inner structure of the aircraft having an end which is essentially fork-shaped on both sides of the partition wall or stiffening rib 24 and which, by means of a bolt displaceable in the longitudinal direction, establishes the connection between the aircraft body and the luggage rack in order, in the event of stressing, to permit movements of the luggage rack in that direction, i.e. the shortening of the structural component.

Figure 5:
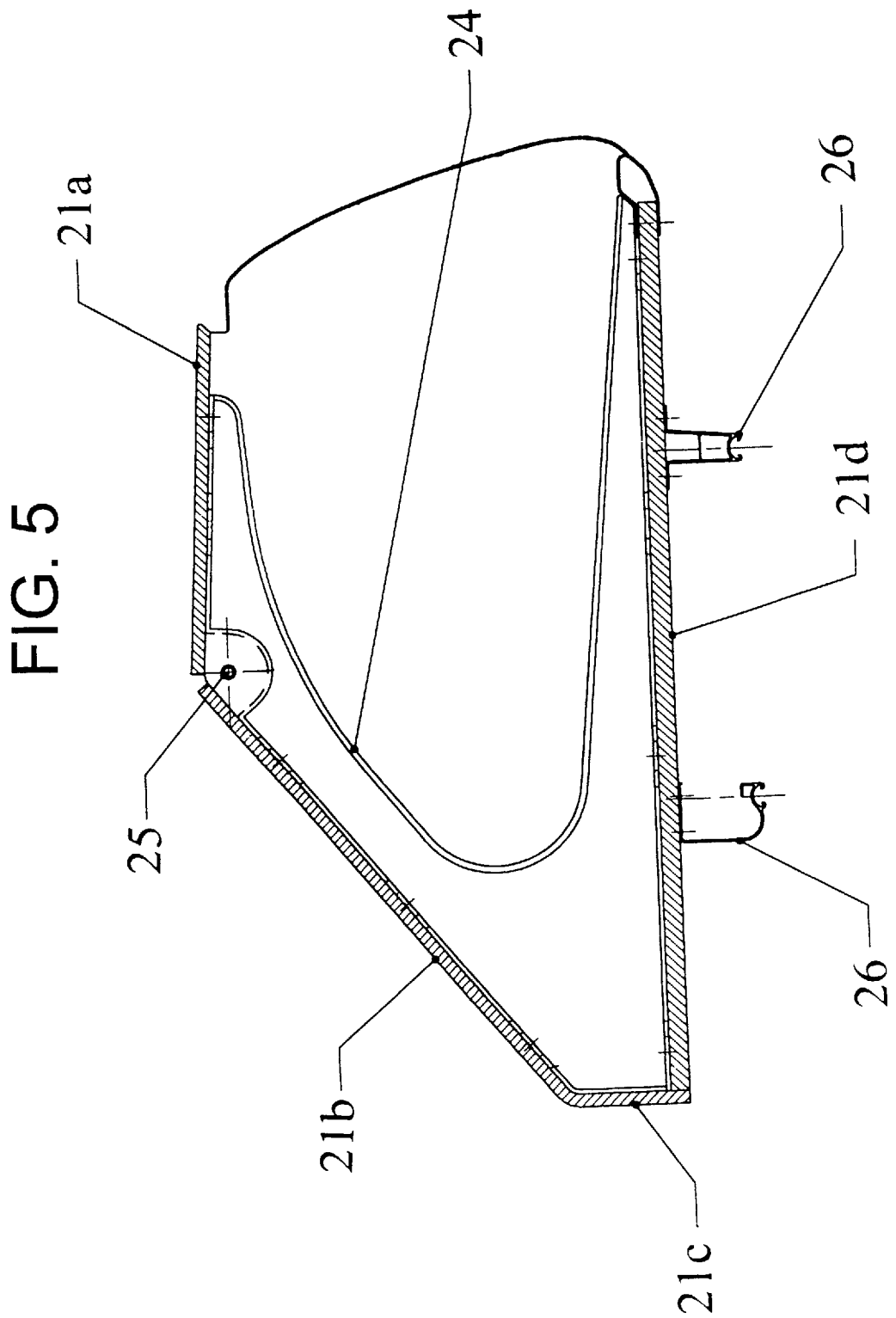
FIG. 5 represents a section through a luggage rack according to FIG. 4.

As is clearly apparent from FIG. 5, the partitioning wall 24 is not of the same size as the end wall 20 of the luggage rack but is cut out to a substantial degree towards the rear wall 21b so as to form a kind of stiffening rib and to attain an even greater weight reduction. The partitioning wall 24 is fixed in the container to the component 21, which fixing is preferably brought about by screws, optionally also by rivets, adhesive bonding or welding. In the case of a screw or rivet connection as illustrated in the schematic perspective view from behind/above, in FIG. 6, at least one additional layer of carbon fibre prepreg 30 is provided in the connecting region for locally increasing the strength. The aforedescribed delamination during the manufacture of the bores and the coming loose of the cover layers, when loads are applied, may be counteracted advantageously by a layer of glass fibre prepreg 31 on the outside of the overhead luggage rack along the entire region of contact and force application between the component 21 and the partition or stiffening rib 24.

Figure 6:
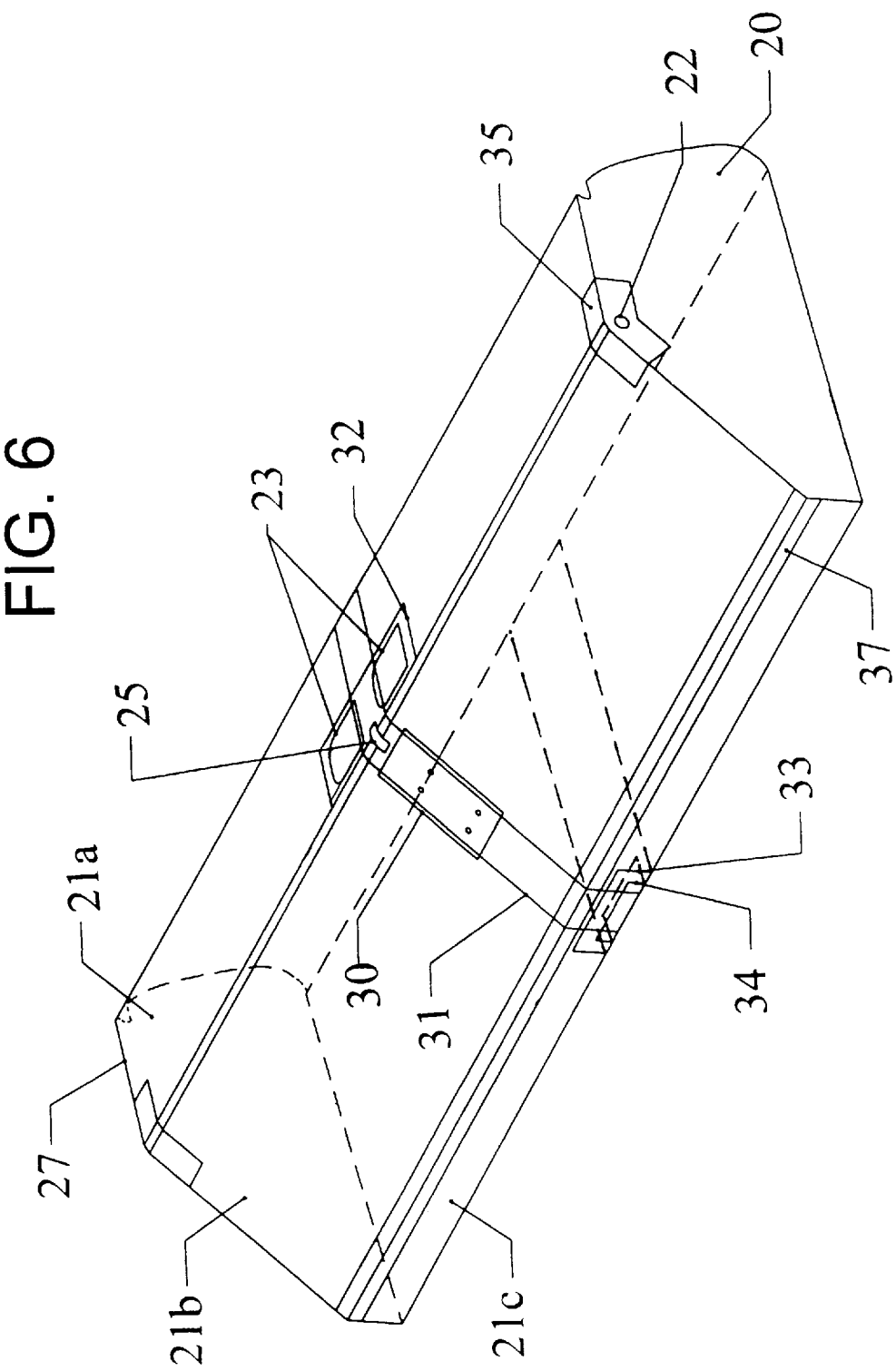
FIG. 6 is a perspective schematic illustration of the luggage rack showing the positions of additional reinforcing layers of prepregs and FIG. 7 represents schematically on a larger scale the suspension region of the luggage rack.

In the region of the apertures 23 and 25 in the upper wall section 21a, for gaining access to the linkage for suspending the container and to fittings and connections situated behind the component, it is possible as illustrated in FIG. 6 to provide likewise a suitable outer layer, glass fibre prepreg 32, of such size that glass fibre material is still to be found in the marginal zone of the component for local reinforcement and for avoiding delaminations which may arise even during processing.

In addition, an additional reinforcing layer preferably in the form of a high load-bearing carbon fibre prepreg 33 is provided in the region 34, where forces attack, of the edge region between the bottom panel 21d and the rear most wall section 21c. This force attack element 34, also referred to as an "X bracket", contact area for force transmission is enlarged by the additional layer and on the other hand this position in the edge region is substantially reinforced, which in accordance with loading tests is particularly critical with regard to delaminations.

Finally, in the context of the bores 22 in the end walls, and serving for suspending the compartment, at least 3 or more layers of prepreg 34 are provided to reinforce those regions. In this specific case these are once again one or more carbon fibre prepregs according to the invention which advantageously have been wrapped around the edge or edges between the upper wall 21a or the wall section 21b of the luggage rack onto the respective end wall 20. If, for example, the upper wall 21a during curing does not yet bear against the matching edge of the end wall 20 of the container, so as to facilitate mould stripping and only subsequently is bent around somewhat in the connection link and is appropriately fixed by means of screws 27 or even adhesive action into its final position, one or all other layers of additional prepreg 35 are wrapped around the edge only in the region of the rear wall 21b which, even during curing, is itself connected to the rear wall 20 by this procedure, and the prepreg 35 in the screwed on section of wall 21a and end wall 20 proceeds separately.

Figure 7:
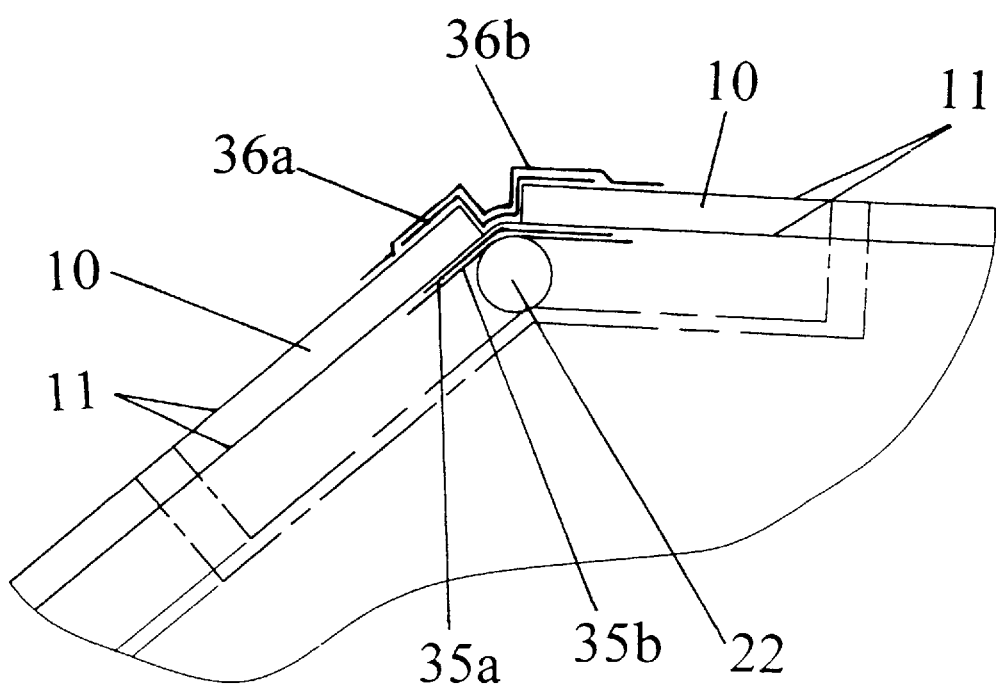

FIG. 7 shows a preferred example of the embodiment of the luggage rack in the region of the bores 22 in a schematic illustration. In that case at least 2 additional carbon fibre prepregs 35a to 35b which overlap each other in a suitable manner, being of staggered outlines to provide a progressive transition in the region of the bore 22, are provided on that side which in relation to the core material 10 is innermost. The same applies, also advantageously, to the at least two further prepreg layers 36a and 36b, applied as reinforcements on the outside of the core 10 and which, since these are the regions of maximum loading, are appropriately likewise constructed of carbon fibre prepregs.

In order to avoid delaminations in the event of relatively heavy loads on the luggage rack, at least one additional layer of glass fibre prepreg is also provided as a reinforcing layer in the strongly buckled or bent region of transition from the rear wall 21b to the wall section 21c at the edge formed by this transition. This reinforcing layer is also applied directly onto the core because the delamination here to be prevented likewise concerns delaminations from the core.

In the following first Table A the weights attained, in each case for panels 1 m² large, constructed in accordance with the invention—from which attainable weight reductions are already clearly apparent and which by virtue of the aforedescribed constructional expedients are also attainable in practice—as well as strength data determined by tests, and compared with a panel of conventional construction (first column) from which a clear improvement of the strength/weight ratio could be demonstrated.

In a further Table B the weights and the respective weight savings for overhead luggage racks according to the invention, essentially in accordance with the embodiments of FIGS. 4 to 7, by comparison with a conventionally designed luggage rack complying with the same requirements are given. Depending on the aircraft type, weight savings of the order of about 40 kg can be attained according to the invention for a complete set of the equipment.

TABLE A

| | | | | | | | | |
|---|---|---|---|---|---|---|---|---|
| Raw weight/hard content determined value | 490/37% | 150/45% | 150/41% | 160/45% | 170/45% | 170/45% | 190/41% | 150/41% |
| Thickness (mm) | 14,074 | 13,932 | 13,922 | 13,942 | 13,950 | 13,962 | 13,998 | 13,887 |
| Force/displacement (kg/cm) | 426,529 | 568,332 | 554,426 | 568,164 | 637,635 | 664,549 | 654,961 | 587,732 |
| Flexing (mm) | 15,040 | 11,280 | 11,573 | 11,280 | 9,627 | 10,053 | 9,800 | 10,920 |
| Breaking load (kg) | 58,325 | 52,023 | 50,360 | 55,687 | 56,267 | 57,767 | 66,509 | 52,468 |
| Weight (g/m$^2$) | 1898 | 1411 | 1387 | 1458 | 1478 | 1496 | 1563 | 1290 |
| Breaking tension (kg/cm$^2$) | 285012,18 | 394710,31 | 419049,51 | 358740,43 | 353000,93 | 419439,88 | 384545,13 | 355973,223 |
| Delamination test - Tedlar (N) | 88,30 | 37,67 | 50,33 | 40,67 | 56,67 | 44,33 | 37,67 | ca. 50,00 |
| Delamination test (N) | 48,33 | 32,33 | 36,00 | 35,33 | 48,33 | 37,33 | 35,00 | >35,00 |
| Weight reduction (g/m$^2$) | | 487 | 511 | 440 | 420 | 402 | 335 | 608 |
| Weight reduction (%) | | 25,660 | 26,920 | 23,180 | 22,130 | 21,180 | 17,650 | 32,034 |

TABLE B

| Container DAN 407-07 | Container - 170 g/m$^2$ calendared | Container - 150 g/m$^2$ | Container - 150 g/m$^2$ calendered | Container - 150 g/m$^2$ calendered/reinforced (FIG. 6) |
|---|---|---|---|---|
| 8200 g | 7006 g | 6502 g | 6047 g | 6196 g |
| 100% | 85,44% | 79,29% | 73,74% | 75,56% |

What we claim is:

1. Container for use in the aviation industry, comprising plane end wall members, optionally intermediate wall members and side wall members or a surround member, said side wall members or said surround member being formed by a single flexed or buckled component, at least one of said members being manufactured of composite material of fibre reinforced material in sandwich construction with a core, said core extending over at least the dominant surface area of said member with at least one covering layer on both sides of said core, at least one of said covering layers being formed by a laminate, said laminate being bonded to said core by means of an adhesive, or said covering layers being formed by a prepreg, said laminate or said prepreg being manufactured of woven or non-woven fabric, said fabric showing a weight per unit area of less then 190 g/m$^2$, and said fabric being manufactured from fibres having a modulus of elasticity of at least 80000N/mm$^3$, said fibres consisting of at least 3000 mono-filaments, and said fabric having been flattened for reducing open spaces in said fabric.

2. Container according to claim 1, wherein said side wall members or surround member being connected with said end wall members and/or said intermediate wall members at least in a partial region of the circumference of said end wall members and/or intermediate wall members by overlapping of said laminates or said prepregs, and being further connected in another partial region of the circumference of said end wall members and/or said intermediate wall members by means of a subsequently applied screw connection, adhesive connection, welding or other suitable connection.

3. Container according to claim 1, wherein at the transitional regions between said side wall members or surround member and said end wall members and/or intermediate wall members and/or at the regions, where said side wall members or surround member being flexed or buckled at least one additional overlapping layer of laminate or prepreg being provided.

4. Container according to claim 3, wherein said additional overlapping layer of laminate or prepreg being applied between said covering layer and said core forming said members.

5. Container according to claim 4, wherein at least two mutually overlapping layers of laminate or prepreg are provided, said layers having different dimensions.

6. Container according to claim 1, wherein at least one additional layer of laminate or prepreg being provided at positions, where holes or openings are provided, said additional layer of laminate or prepreg being manufactured from glass fibre fabric.

7. Container according to claim 6, wherein said additional layers of laminate or prepreg being applied above said covering layer on the side of said covering layer facing away from said core.

8. Container according to claim 1, wherein at regions, where said side wall members or surround member being connected with said end wall members and/or intermediate wall members and/or stiffening means at least one additional layer of laminate or prepreg being applied, said additional layer of laminate or prepreg being manufactured from glass fibre fabric.

9. Container according to claim 8, wherein said additional layer of laminate or prepreg being applied above said covering layer.

10. Overhead stowage container for use in an aircraft, comprising a container as claimed in claim 1, wherein an intermediate wall member subsequently being applied, and wherein the end wall members are in shape of a trapezoid, and wherein in each said end wall members a hole being provided for suspension purposes, said holes being located close to one of the upper corners of said end wall members, and wherein a plurality of additional layers of laminate or prepreg being applied at the regions of said holes, wherein said layers of laminate or prepreg being manufactured from carbon fibres.

11. Overhead stowage container according to claim 10, wherein said additional layers of laminate or prepreg being folded around said end wall members.

12. Overhead stowage container according to claim 10, wherein in the upper region of said component forming said side wall members or said surround member on both sides of said intermediate wall member two holes and an aperture are provided for suspension purposes, and wherein at regions, of said holes and said aperture at least one additional layer of laminate or prepreg being applied, said additional layer of laminate or prepreg being manufactured from glass fibre fabric.

13. Overhead stowage container according to claim 10, comprising a reinforcement element, said reinforcement element being applied at the level of said intermediate wall member between the lower and the rear section of said component forming the side wall member or said surround member, wherein in the region of this reinforcement element at least one covering layer of laminate or prepreg being applied, said layer of laminate or prepreg being manufactured from carbon fibres.

14. Overhead stowage container according to claim 13, wherein the dimensions of the end regions of said layer of laminate or prepreg overlapping said lower and rear section of said component from the lower edge of said component are identical, resulting in a uniform distribution of arising forces over the component.

\* \* \* \* \*